United States Patent [19]

Beun et al.

[11] 4,364,718

[45] Dec. 21, 1982

[54] DISPOSABLE PUMP FOR DISPENSING SMALL METERED AMOUNTS OF LIQUID FROM A CONTAINER AND A CONTROL UNIT FOR OPERATING SAID PUMP

[75] Inventors: Jacobus H. Beun, Maassluis; Jan van Duijn, Vlaardingen, both of Netherlands

[73] Assignee: Internationale Octrooi Maatschappij "Octropa" BV, Rotterdam, Netherlands

[21] Appl. No.: 237,706

[22] Filed: Feb. 24, 1981

[51] Int. Cl.³ .................... F04B 39/10; B67D 3/00
[52] U.S. Cl. .................................. 417/500; 222/181
[58] Field of Search ............. 417/500, 492, 498, 489; 222/181, 373, 383, 384

[56] References Cited

U.S. PATENT DOCUMENTS

| 922,453 | 5/1909 | Burgner | 222/181 |
|---|---|---|---|
| 1,553,113 | 8/1925 | Rutt | 222/181 X |
| 1,790,228 | 1/1931 | Chambers | 222/181 |
| 2,605,021 | 7/1952 | Churchill et al. | 222/181 X |
| 2,702,510 | 2/1955 | Dourte | 417/500 |
| 3,022,742 | 2/1962 | Bowen, Jr. | 417/500 X |
| 3,200,994 | 8/1965 | Levinson et al. | 222/181 X |
| 3,250,438 | 5/1966 | Packwood, Jr. | 222/181 |
| 3,550,648 | 12/1970 | Tabor et al. | 417/500 X |
| 3,809,293 | 5/1974 | Chappell | 222/181 X |

FOREIGN PATENT DOCUMENTS

| 26077 | 11/1952 | Finland | 222/181 |
|---|---|---|---|
| 954767 | 12/1949 | France | 417/500 |

Primary Examiner—Leonard E. Smith
Attorney, Agent, or Firm—Cushman, Darby & Cushman

[57] ABSTRACT

A disposable pump of plastics material for dispensing small metered amounts of liquid from a single opening container to which it has been attached and which can be closed thereby, comprises a one piece housing and a cylindrical piston; the housing has gas inlet means for allowing gas to enter the container if any subatmospheric pressure should occur therein. A control unit for operating this pump comprises a programme for imparting a certain succession of rotative and sliding movements to the piston of said pump.

10 Claims, 7 Drawing Figures

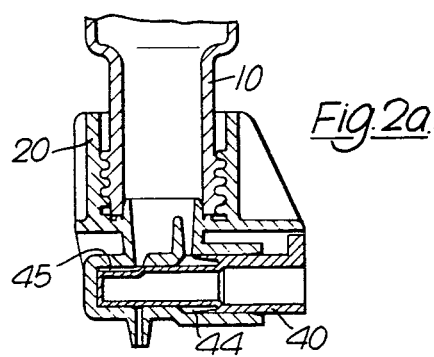
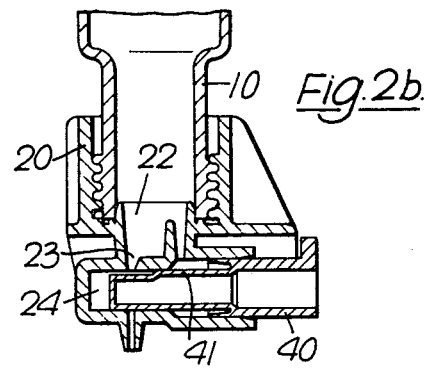
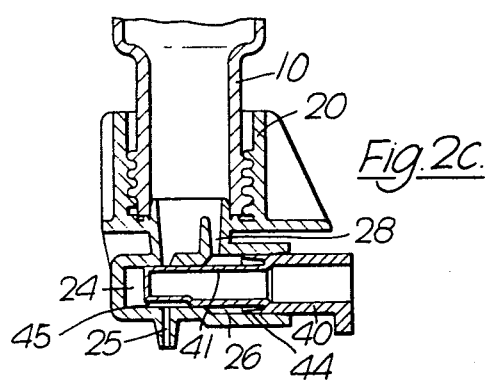
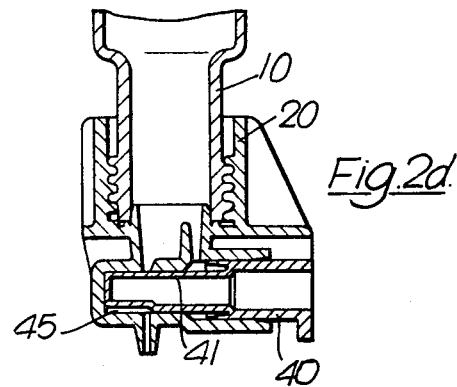
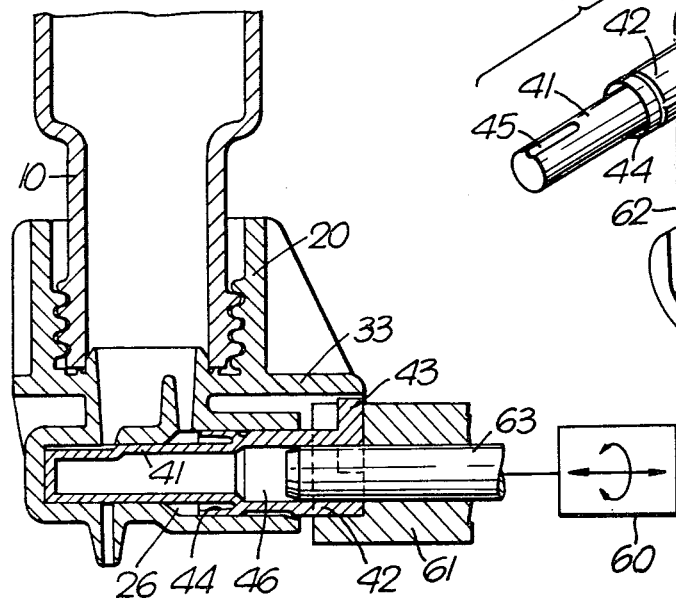
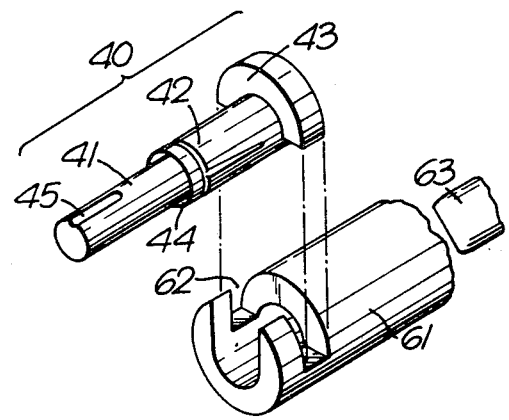

DISPOSABLE PUMP FOR DISPENSING SMALL METERED AMOUNTS OF LIQUID FROM A CONTAINER AND A CONTROL UNIT FOR OPERATING SAID PUMP

BACKGROUND OF THE INVENTION

The present invention relates generally to the field of dosage pumps and more particularly to a disposable dosage pump for accurately dispensing small metered amounts of liquid from a container having only one mouth opening with adjacent connecting means.

Pumps for dispensing small amounts of liquid are conventional and known in the art. The construction involves generally a considerable number of rather complex parts rendering the pump rather expensive and unsuitable for single use. This requires containers with separate closure means, which have to be removed prior to attaching the pump, removing the pump again after having dispensed the required amounts of liquid and closing the container again. Moreover, the pump has to be cleaned after each use in order to prevent contamination of a later liquid to be dispensed thereby. Particularly in the medical field, where potentially infected fluids are to be handled and infection of the operator and cross-infection are to be prevented, the need for carefully cleaning and drying the pump is existent.

SUMMARY OF THE INVENTION

Accordingly it is an object of the invention to provide a pump which overcomes the disadvantages associated with conventional such pumps.

Particularly it is an object of the invention to provide a pump which can be cheaply manufactured so that it can be used as a disposable.

In addition it is an object of the invention to adapt a pump such as to make it suitable for use as a closure for a container.

Additionally it is an object of the invention to provide a pump with means for allowing gas to enter into a container if any subatmospheric pressure should occur in said container.

Furthermore it is an object of the invention to provide a control unit for operating the disposable pump.

Accordingly the present invention provides a disposable pump for dispensing small metered amounts of liquid from a container having only one mouth opening with adjacent connecting means for the pump,
said pump comprising a housing and a cylindrical piston,
said housing having a first bore, closed at one end, for slidably and rotatably accomodating the piston, a second bore disposed perpendicularly with respect to the first bore, connecting means for co-operating with those of the container being arranged adjacent the outer end of the second bore.
said first bore comprising a narrow inward section and a coaxial wider section,
said narrow section communicating through a supply conduit with the second bore and through a dispensing conduit with a dispensing orifice opening outside the housing,
the wider section communicating near its inward end portion through a gas inlet conduit with the second bore,
said piston comprising a thinner inward section, closely fitting in the narrow section and provided with at least one groove at least partly extending longitudinally with respect to the piston up to the inward end thereof and being arranged such as to prevent simultaneous communication with both the supply conduit and the dispensing conduit.
said piston having a coaxial cylindrical sealing lip elastically bearing against the inner surface of the wider section of the first bore.
said piston also having coupling means for connection with a control unit for transmitting both longitudinal and rotational movement of the piston.

In a preferred embodiment of said pump the supply conduit and the dispensing conduit was aligned.

In order to prevent an unintended escape of fluid from a container to which the pump according to the invention is attached, the coupling means of said pump in the inward position of the piston are preferably at least partly surrounded by a protective portion which is integral with the housing.

For suitably engaging the coupling means of the piston by co-operating coupling means of a control unit, the piston is a preferred embodiment comprises a central hole, opening at the outward end of the piston.

In use a subatmospheric pressure inside the container is prevented by allowing gas to enter through a gas inlet conduit. In order to prevent any possibility of dispensing gas instead of liquid from said container, preferably a partition is arranged in the second bore of the pump housing between the supply conduit and the gas inlet conduit.

In a simple embodiment, which is easy to manufacture, the coupling means of the piston comprises at least one radially projecting protuberance.

A reliable seal of the piston in the first bore and a suitable admission of gas are obtained by arranging the sealing lip of the piston with its free end pointing towards the inward end of the piston.

The invention also provides a control unit for operating the invented pump, said control unit having complementary coupling means for co-operating with the coupling means of the pump, motor means operatively connected to said coupling means and control means having at least one programme for imparting a certain succession of rotative and sliding movements to said coupling means.

In a preferred embodiment the programme of said control unit comprises the following sequence of movements: multiple sliding movements of the piston with its slit communicating with the inlet conduit, the last movement being outward, rotating the piston until the slit communicates with the dispensing conduit, sliding the piston inward, multiple successions of rotating the piston until the slit communicates with the inlet conduit, sliding the piston outward, rotating the piston until the slit communicates with the dispensing conduit and sliding the piston inward, and finally sliding the piston outward, rotating the piston until the slit communicates with the inlet conduit and sliding the piston inward again.

For obtaining a smooth dispensing of liquid it is preferred for the motor means to be adapted to sliding the piston inwards with a steadily increasing velocity.

BRIEF DESCRIPTION OF THE DRAWINGS

With the above and additional objects and advantages in view, the present invention may be better understood by referring to the drawings, in which:

FIGS. 2a through 2d are partial sections similar to FIG. 1, showing four positions of the piston during operation of the pump.

FIG. 3 is a view in perspective of a piston with coupling means and complementary coupling means for co-operation.

FIG. 4 is a partial section through a container and a pump having complementary coupling means attached thereto.

DETAILED DESCRIPTION OF THE INVENTION

Figure 1:
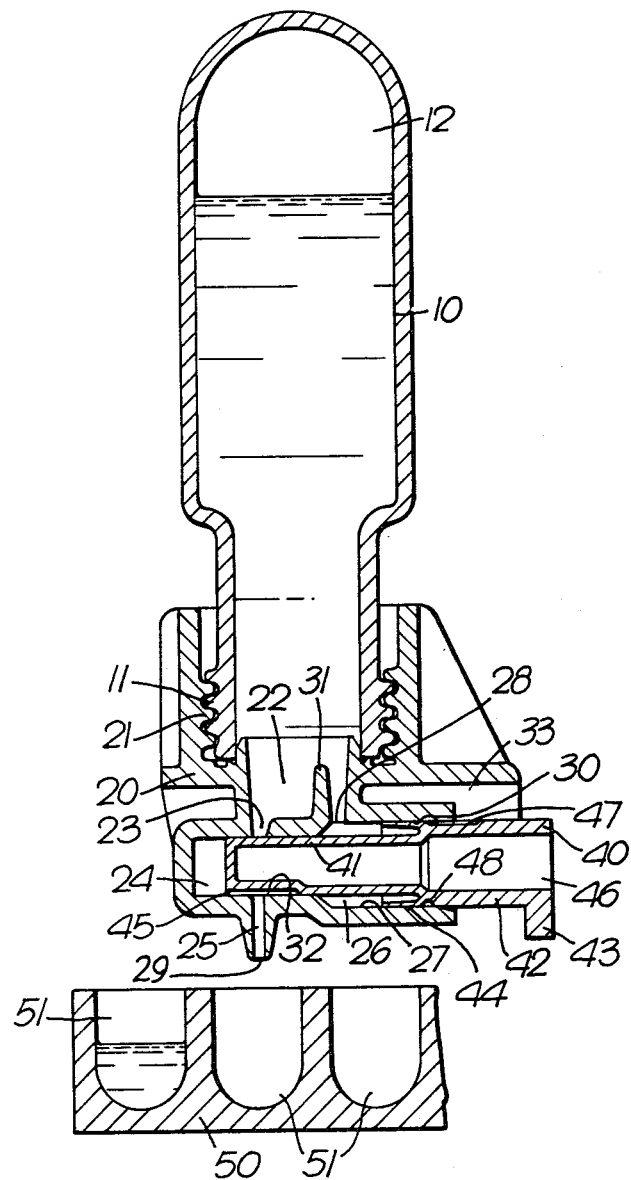
FIG. 1 is a vertical section through a pump according to the invention having a container attached thereto and through a plate having cavities to be filled by liquid from the container.

Referring now to the drawings and more particularly to FIG. 1, the present invention involves a disposable pump for connection to a container, for example a small bottle 10 as shown. It has been tightly connected, by means of connecting means, such as screw thread 11, to a pump housing 20, which has co-operating connecting means, i.e. screw thread 21. A pump piston 40 is accomodated in the pump housing 20. Plates 50 with receiving cavities 51, in which the liquid from the container 10 is to be dosed, e.g. in amounts of 0.05 cm$^3$, are passed below the pump housing.

The pump housing 20 contains a second bore 22 for supplying liquid from the bottle 10, a first bore 24, in which a cylindrical piston 40 can be moved and one closed end of which forms the dosing chamber and a supply conduit 23 between the first bore 22 and the second bore 24.

A dispensing conduit 25, opening into a dispensing orifice 29, is connected with the first bore 24. The first bore 24 comprises a narrow inward section forming the dosing chamber and a wider outward section 26 coaxially therewith. The wider section 26 is connected with the cavity 12 of the container 10 via a gas inlet conduit 28.

The inward section 41 of the pump piston 40 is mainly cylindrical and its diameter matches that of the cylindrical narrow section of the first bore 24. The outward section 42 of piston 40 has a larger diameter and is hollow. Its hole 46 is opening at the outward end of the piston 40. Said end of the piston is provided with coupling means, such as a flange-shaped part 43, which can be coupled with a control unit for driving the piston 40. From the thicker section 42 a coaxial and approximately cylindrical sealing lip 44 extends towards the closed end of the first bore 24 and elastically bears against the wall 27 of the wider section 26. The diameter of the free end of the sealing lip 44 is somewhat larger than the diameter of the wider section 26, so that the lip, when the piston 40 is slid into the pump housing 20, sealingly bears against the wall 27. In order to get lip 44 into the wider section 26 without damage, this section is provided with a flaring end 30.

The thinner inward section 41 of the piston 40 is provided, at its cylindrical surface, with a longitudinal groove 45, forming, with wall 32 of the narrow section 24, a channel through which the liquid can flow either from the supply conduit 23 into said narrow section 24 or from said narrow section 24 to the dispensing conduit 25. For practical reasons both parts are manufactured by injection moulding from a rigid plastics material and can therefore be relatively cheap and destined for single use, that is to say for dosing the contents from only one container. In this case the pump may also serve as a closing means after the filling of the container. The position of the piston is then as shown in FIG. 2a, in which the piston cannot be moved without mechanical aids, as the outward section 42, which protrudes from the pump housing, and the flange-shaped part 43 of the piston 40 are surrounded as much as possible by a semicylindrical protective jacket 33 integral with the pump housing 20.

For dispensing liquid from the container 10, this container and the pump in the position shown in FIG. 2a, are placed in a holding device (not shown here) for the pump housing 20 and connected with a control unit (not shown here either) for the pump piston 40. First piston 40 is moved outwardly (FIG. 2b). Thereby the liquid is sucked from the container 10 through the second bore 22, the supply conduit 23 and the groove 45 into the narrow section 24. Meanwhile the dispensing conduit 25 is closed by the foremost cylindrical part 41 of piston 40.

In this rotational position, i.e. with the groove 45 in its upward position, the piston 40 is moved inwardly again for expelling the air from the narrow section. This sequence is repeated one or more times.

Thereafter, the piston in its outward position is rotated over 180° (FIG. 2c) and then pushed inwardly again (FIG. 2d), whereby the liquid from the narrow section 24 is forced through the groove 45, the dispensing conduit 25 and the dispensing orifice 29 into one of the cavities 51 of the plate 50.

By rotation of the piston over 180° and retraction the narrow section 24 is filled again with liquid which can be dispensed by rotation and inward movement of the piston. This succession of movements is repeated until the required number of metered amounts of liquid has been dispensed.

Thereafter the piston 40 is pulled outwardly with the groove 45 in its lower position, rotated over 180° and pushed inwards again, thereby forcing liquid back into the container. Subsequently the pump and the container can be removed from the holding device.

When dispensing liquid the motor means for moving the piston 40 inwards are to be controlled in such a way that said piston is moved inwards with a steady increasing velocity.

By sucking the liquid into the narrow section 24 by the outward movement of the piston, under-pressure develops in the cavity 12 of the container and, of course, also in the chambers of the pump connected therewith. If the under-pressure in the wider section 26 of the first bore is high enough, the sealing lip 44 is lifted from the inner wall 27 of said section, so that some air or gas can flow into said wider section 26. The air rises through the gas inlet conduit 28 and accumulates in the upper part of the cavity 12 of container 10. A wall 31 separating the gas inlet conduit 28 from the liquid supply conduit 23 prevents the air from being sucked into said supply conduit 23. The admission of air is only caused by under-pressure in the container, which varies according to the amount of liquid in the container and does not depend on a certain movement or position of the piston.

The connection of piston 40 with the control unit 60 (depicted schematically) is shown in FIGS. 3 and 4. The outward end of the piston 40 with flange-shaped part 43 is placed in a tube 61 which at its end is provided with a corresponding recess 62. A pin 63 movable in tube 61 is pushed into the hole 46 of the piston to stabilize the connection between piston 40 and driving means of the control unit 60. The aforesaid movements of the piston can now be effected by providing the control unit 60 with a suitable programme for obtaining the succession of rotational and axial movements (as shown schematically by the arrows in FIG. 4).

Having thus set forth the nature and characteristics of the present invention, it will be understood that still other embodiments and variations thereof may come to mind and all such embodiments and variations are considered part of the present invention if encompassed by the appended claims.

What we claim is:

1. A disposable pump for dispensing small metered amounts of liquid from a container having only one mouth opening with adjacent connecting means for the pump, said pump comprising a housing and a cylindrical piston, said housing having a first bore, closed at one end, for slidably and rotatably accomodating the piston, a second bore disposed perpendicularly with respect to the first bore, connecting means for co-operating with those of the container being arranged adjacent the outer end of the second bore, said first bore comprising a narrow inward section and a coaxial wider section, said narrow section communicating through a supply conduit with the second bore and through a dispensing conduit with a dispensing orifice opening outside the housing, the wider section communicating near its upward end portion through a gas inlet conduit with the second bore, said piston comprising a thinner inward section, closely fitting in the narrow section and provided with at least one groove at least partly extending longitudinally with respect to the piston up to the inward end thereof and being arranged such as to prevent simultaneous communication with both the supply conduit and the dispensing conduit, said piston having a coaxial cylindrical sealing lip elastically bearing against the inner surface of the wider section of the first bore, said piston also having coupling means for connection with a control unit for transmitting both longitudinal and rotational movement to the piston.

2. The pump of claim 1, wherein the supply conduit and the dispensing conduit are aligned.

3. The pump of claim 1, wherein the coupling means in the inward position of the piston are at least partly surrounded by a protective portion which is integral with the housing.

4. The pump of claim 1, wherein the piston comprises a central hole, opening at the outward end of the piston.

5. The pump of claim 1, wherein an axial partition is arranged in the second bore between the supply conduit and the gas inlet conduit.

6. The pump of claim 1, wherein the coupling means comprises at least one radially projecting protuberance.

7. The pump of claim 1, wherein the sealing lip has its free end pointing towards the inward end of the piston.

8. A control unit for operating the pump of claim 1 having complementary coupling means for co-operating with the coupling means of the pump, motor means operatively connected to said coupling means and control means having a programme for imparting a certain succession of rotative and sliding movements to said coupling means.

9. The control unit of claim 8, wherein the programme comprises the following sequence of movements: multiple sliding movements of the piston with its slit communicating with the inlet conduit, the last movement being outward, rotating the piston until the slit communicates with the dispensing conduit, sliding the piston inward, multiple successions of rotating the piston until the slit communicates with the inlet conduit, sliding the piston outward, rotating the piston until the slit communicates with the dispensing conduit and sliding the piston inward, and finally sliding the piston outward, rotating the piston until the slit communicates with the inlet conduit and sliding the piston inward again.

10. The control unit of claim 8, wherein the motor means are adapted for sliding the piston inwards with a steadily increasing velocity.

* * * * *